United States Patent [19]
Hill et al.

[11] Patent Number: 5,460,327
[45] Date of Patent: Oct. 24, 1995

[54] EXTENDED CLOCK THERMOSTAT

[75] Inventors: Mark A. Hill, Lafayette; Laurie L. Werbowsky, Jamesville, both of N.Y.

[73] Assignee: Carrier Corporation, Syracuse, N.Y.

[21] Appl. No.: 269,743

[22] Filed: Jul. 1, 1994

[51] Int. Cl.$^6$ ............................................. F23N 5/20
[52] U.S. Cl. ...................... 236/46 R; 165/12; 307/66; 365/229
[58] Field of Search ................. 236/46 R; 165/12; 62/231; 307/66; 365/229

[56] References Cited

U.S. PATENT DOCUMENTS

| | | |
|---|---|---|
| 4,267,966 | 5/1981 | Neel et al. ..................... 165/12 X |
| 4,431,134 | 2/1984 | Hendricks et al. ............... 236/46 R |
| 5,251,813 | 10/1993 | Kwiepkamp ....................... 236/46 R |
| 5,277,363 | 1/1994 | Hart ............................ 236/46 R |

*Primary Examiner*—William E. Wayner

[57] ABSTRACT

An electronically controlled thermostat has an emergency power configuration which only provides long term emergency power to a real time clock. All other components of the thermostat function only for a limited period of time following a power outage. Emergency power to the other components is monitored during power outage with appropriate action being taken to assure that control information has been stored in nonvolatile memory before emergency power deteriorates to a critical level.

13 Claims, 6 Drawing Sheets

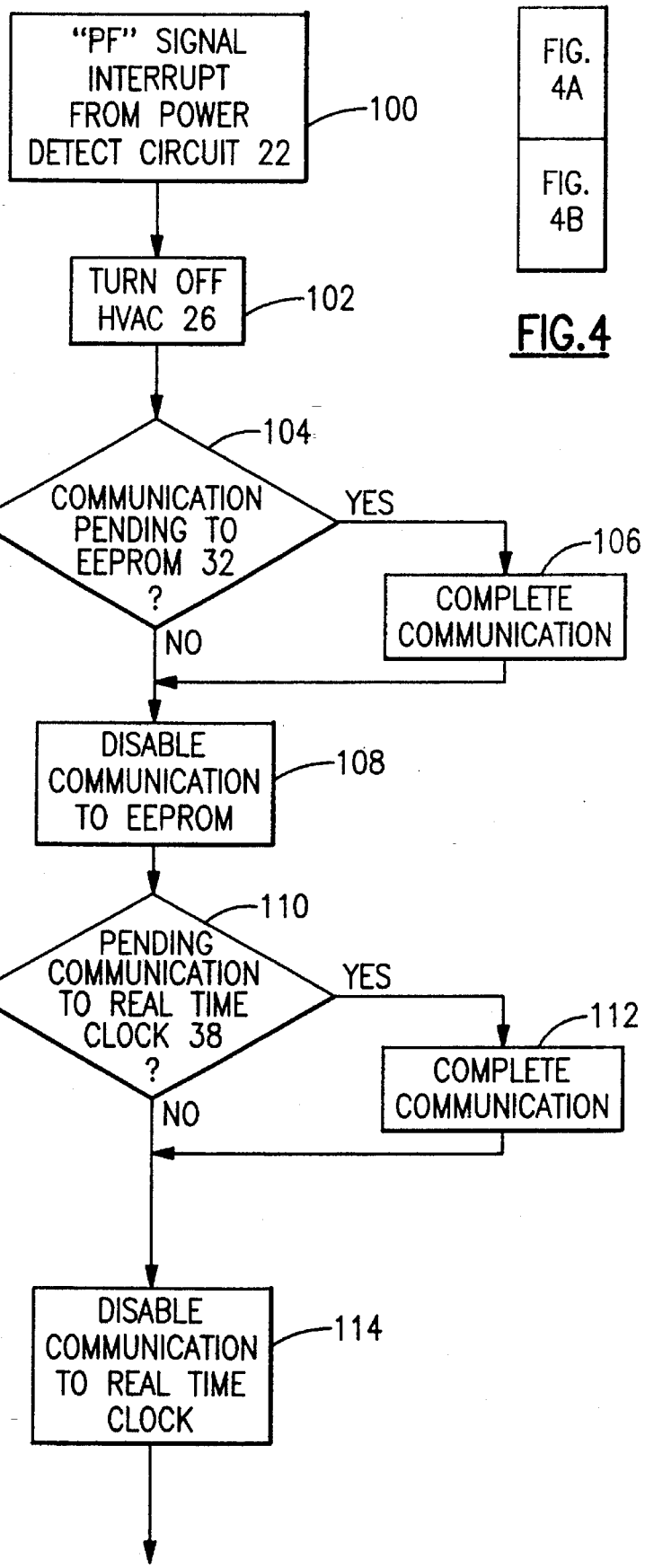

EXTENDED CLOCK THERMOSTAT

BACKGROUND OF THE INVENTION

This invention relates to electronically controlled thermostats and in particular to the back up power capabilities of such thermostats during an outage of normal power.

Electronically controlled thermostats have heretofore included an emergency back up power capability that maintains a supply of power to essential operating components during power outage. This back up power has included use of either batteries or a supercapacitor capable of maintaining an appropriate voltage level for a limited period of time. This emergency back up has normally been provided to the microprocessor and associated memory within the thermostat. This provision of emergency power to the microprocessor and associated memory has however resulted in a significant drain on the emergency power source. This drain typically results in the emergency power running out in one hour or less. When this occurs, the thermostat needs to be manually reset including the resetting of a real time clock.

OBJECTS OF THE INVENTION

It is an object of the invention to provide a thermostat that completely recovers from a power outage without a need to reset the real time clock.

It is another object of the invention to provide a thermostat with a low emergency power configuration that significantly limits the need for emergency power during a power outage.

SUMMARY OF THE INVENTION

The above and other objects of the invention are achieved by a microprocessor controlled thermostat that allows emergency power to deteriorate to most essential components. The emergency power to these components will however be maintained for a sufficient period of time to allow these elements to cease normal operations in an orderly manner. This includes providing sufficient power to a microprocessor to complete any pending communications to an electrically erasable programmable read only memory (EEPROM) as well as to a real time clock. The real time clock is the only component which will continue to receive emergency power for a substantial period of time. When main power is restored, the microprocessor reads the current time from the real time clock and resumes normal operation based on the operating parameters stored in the EEPROM.

In accordance with a preferred embodiment of the invention, the main power outage is detected by a power detect circuit which generates a power fault signal to the microprocessor prompting a powering down sequence. The power detect circuit is operative to change the power fault signal level in the event that main power is restored during the powering down sequence. Normal operations are resumed if this occurs. The ability of the power detect circuit to restore the power fault signal is limited to a period when power has not deteriorated to a point requiring a complete reset of the microprocessor. Complete reset of the microprocessor can occur following restoration of the main power wherein the EEPROM and real time clock are again read before resuming normal operation.

BRIEF DESCRIPTION OF THE DRAWINGS

Other objects and advantages of the present invention will be apparent from the following description in conjunction with the accompanying drawings in which:

FIG. 4 is a key to the reconstruction of FIGS. 4A and 4B.

FIGS. 4A and 4B illustrate a power down process which is triggered when a main power outage occurs for various periods of time.

DESCRIPTION OF THE PREFERRED EMBODIMENT

Figure 1:
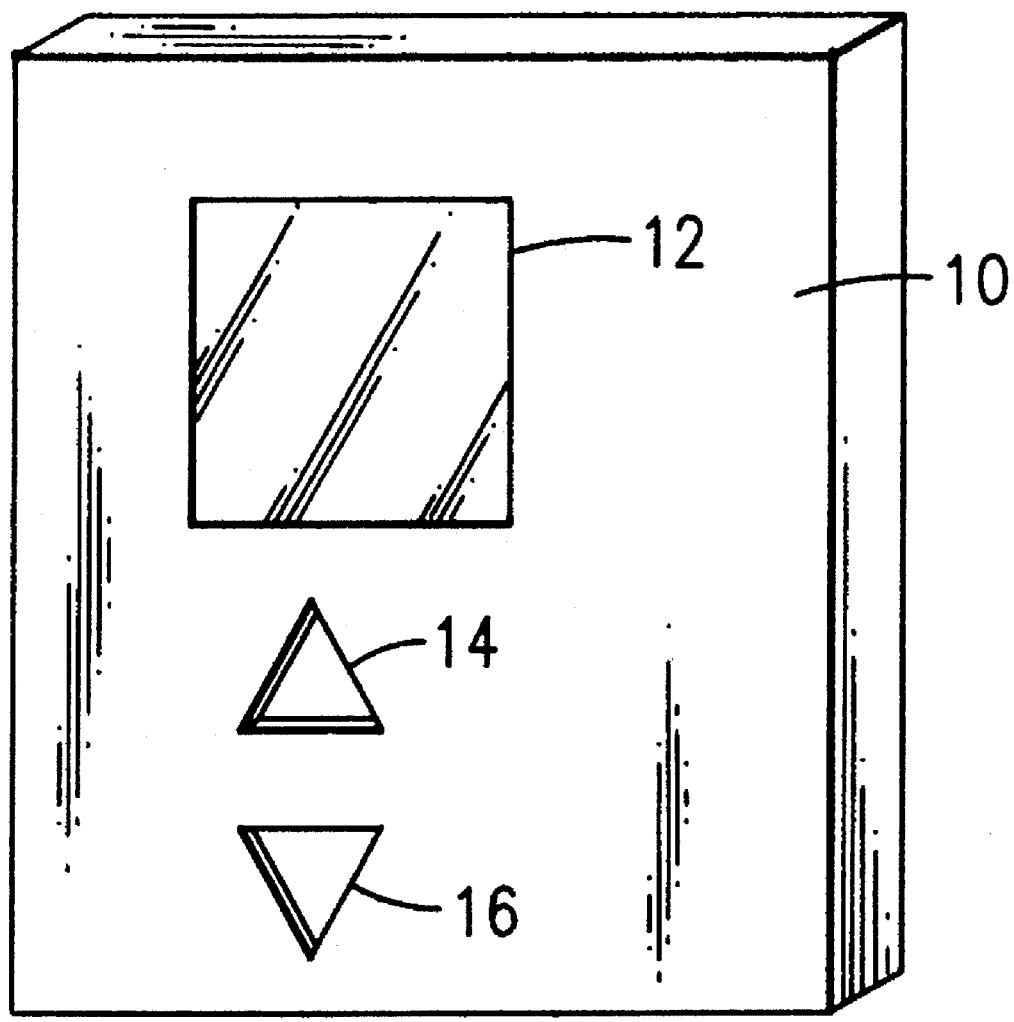
FIG. 1 illustrates a thermostat that may be used to control a heating, venting and air conditioning system.

Referring to FIG. 1, a thermostat 10 is seen to include a visual liquid crystal display 12 as well as pressure sensitive switches 14 and 16 for adjusting a displayed setpoint temperature of the thermostat. The thermostat normally senses the temperature in a room and compares the same with the entered setpoint temperature. A heating or cooling unit is activated when necessary to bring the sensed temperature equal to the setpoint temperature.

Other features not shown in FIG. 1 may also be present in the thermostat. These would include a series of switches for programming the thermostat 10 so as to change setpoint temperature and possibly mode of operation depending on the time of day. Such programmable features are well known in the art.

Figure 2:
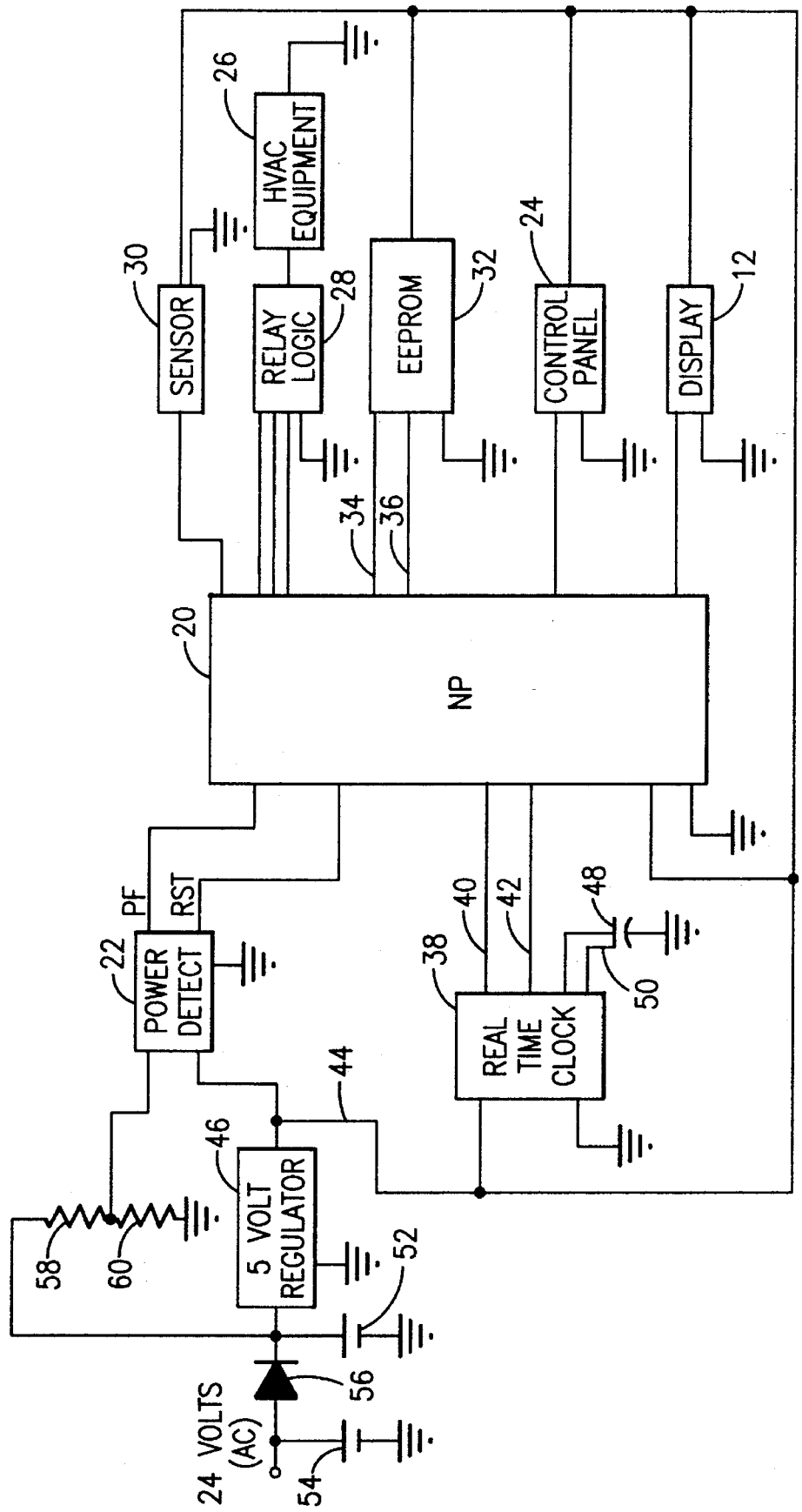
FIG. 2 illustrates a microprocessor control system residing within the thermostat of FIG. 1 and interfacing with the controls of a heating, venting and air conditioning system.

Referring to FIG. 2, the electronic control configuration within the thermostat 10 is illustrated. This configuration includes a microprocessor 20 which executes normal thermostat functions preferably in the form of firmware internal to the programmable microprocessor. This firmware includes an initial "power up" sequence of instructions which is triggered in response to a reset signal "RST" from a power detect circuit 22. The microprocessor also includes a "power down" sequence of instructions preferably in the form of firmware which are executed in response to a transition in a power failure signal "PF" from the power detect circuit 22. The "PF" signal is applied to an interrupt terminal of the microprocessor so as to trigger an interrupt of any process executing within the microprocessor when the "PF" signal transitions from logically low to a logically high level. These executable processes could be responding to information provided thereto from a control panel 24 having switches such as switches 14 and 16 of FIG. 1 or they could be displaying information on the display 12. The primary process executable by the microprocessor 20 is the control of HVAC equipment 26 through relay logic 28 receiving appropriate bilevel control signals from the microprocessor 20. These control signals would include for instance a fan control signal, a signal for activating a cooling unit and, a signal line for activating a heating unit. Three control lines for transmitting these signals between the microprocessor 20 and the relay logic 28 are depicted in FIG. 2. It is to be understood that the HVAC equipment 26 does not form part of the electronic control system within the thermostat 10.

The process for controlling the relay logic 28 is responsive to a temperature being sensed by a sensor 30. This process furthermore reads setpoint information initially provided by a person depressing switches 14 and 16 on the control panel 24 or a default value stored in memory. The setpoint information as well as mode of operation information and other critical user supplied data is preferably executable from an internal randomly addressable memory within the microprocessor 20. This information is permanently stored on an EEPROM 32. The EEPROM is a nonvolatile memory which retains any data written to it from the microprocessor 20 via a data line 34 and provides such data back to the microprocessor via the same data line 34 in response to a read command. The reading and writing of data from the nonvolatile EEPROM memory 32 only occurs during an enablement of this memory chip via a line 36.

The microprocessor also receives real time information from a real time clock 38 via a clock data line 40. This real time information is made available to the microprocessor when the real time clock 38 is enabled via an enabling line 42. The real time clock is preferably a DS 130258 Semiconductor Chip available from Dallas Semiconductor Company. It is to be appreciated that real time clocks are well known in the art and the above reference to a particular product from a particular company is by way of example only.

The real time clock 38 normally receives its electrical power via a main power bus 44 from a five volt regulated power source having a five volt regulator 46. This bus also supplies main power to the microprocessor 20 as well as to all associated logic therewith. In accordance with the invention, the real time clock also receives an emergency power back up voltage from a supercapacitor 48. The supercapacitor is sized so as to provide five volts to the real time clock for preferably two hundred forty hours. The particular capacitance requirement of the supercapacitor 48 when used in combination with the DS 130258 chip is one tenth of a farad. The supercapacitor 48 is normally charged by a trickle current on a line 50 when power is available to the real time clock 38 via the main power bus 46.

Referring to the five volt regulator 46, it is to be noted that a capacitance 52 as well as a capacitance 54 and diode 56 appear upstream of this source of power to the main power bus. The capacitance 54 in combination with the diode 56 rectify twenty four volts rms of a.c. power. The capacitance 54 preferably stabilizes the rectified voltage nominally at thirty three volts. The capacitance 52 is sized to allow the rectified voltage to slowly decay in a manner which will be described hereinafter.

The rectified voltage is applied to the five volt regulator 46 which steps the input voltage down and provides a constant five volts of power. The rectified voltage is also applied to a voltage divider circuit comprising resistors 58 and 60 which divides the rectified voltage down to a voltage that is applied to the power detect circuit 22. The resistors 58 and 60 are preferably sized so as to divide a rectified voltage of fifteen volts down to a voltage of one and a quarter volts. The voltage from the resistors 58 and 60 that is applied to the power detect circuit will hereinafter be referred to as the relative power signal, RELPWR. The power detect circuit 22 also receives the five volts of power occurring on the bus 44.

Figure 3:
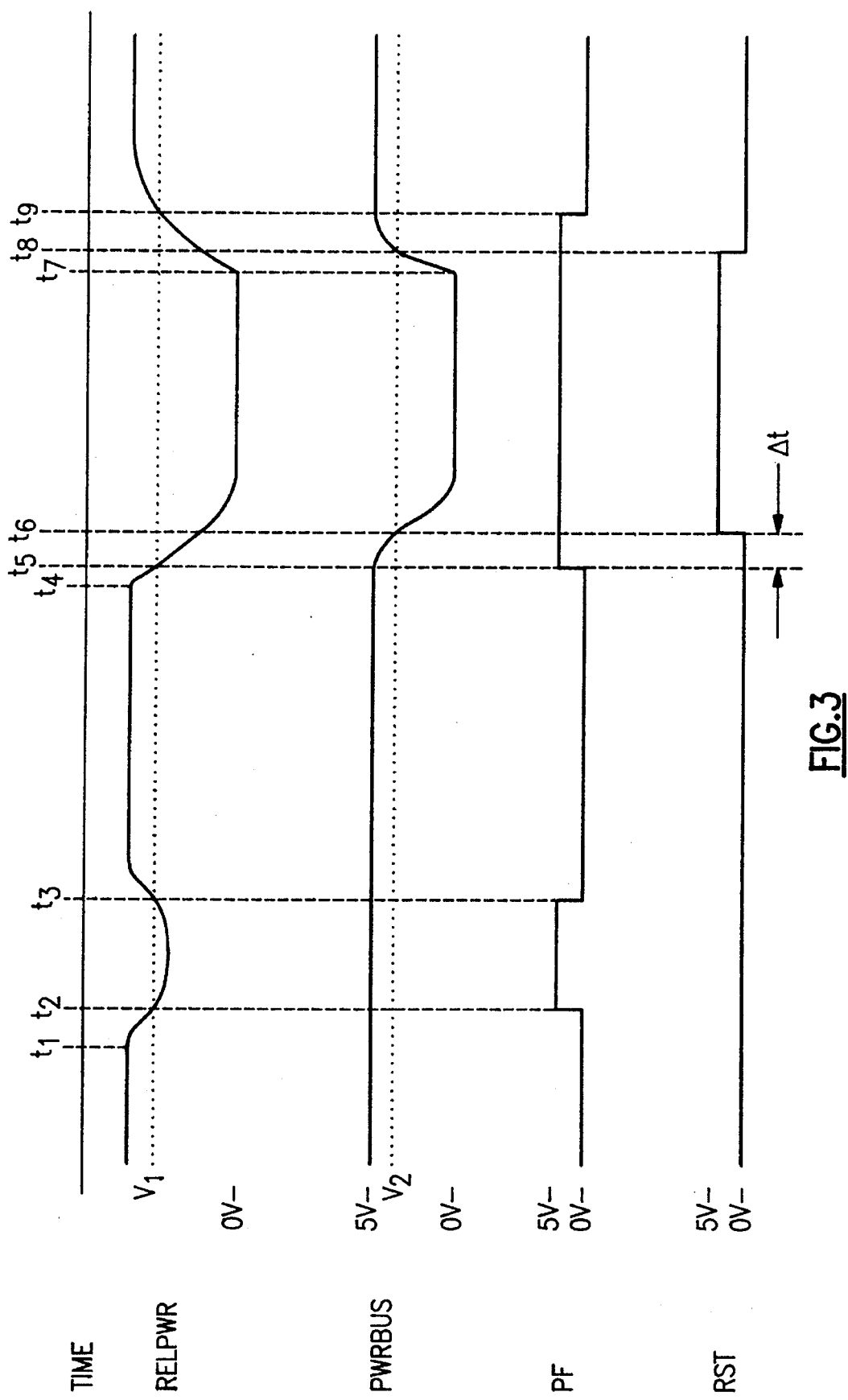
FIG. 3 illustrates certain signals occurring in the control system of FIG. 2 during various power conditions.

It is to be appreciated that power detect circuits are well known in the art and generally available for detection of voltage changes such as will now be described. Referring now to FIG. 3, the relative power signal, RELPWR, that is applied to the power detection circuit 22 is illustrated. The five volt power signal applied to the power detect circuit 22 from the regulator 46 appearing on the power bus 44 is also illustrated as power bus voltage, PWRBUS. The output signals from the power detect circuit, "PF" and "RST", are also illustrated in FIG. 3. Power is interrupted at time $t_1$ in FIG. 3 as is illustrated by a decline in the relative power voltage. The rate of decline of the relative power voltage is governed by the value of capacitance 52 and the downstream loads on this capacitor causing it to discharge. When this voltage reaches $V_1$ volts at a time $t_2$, the power fault signal "PF" changes to a logically high signal level. In the preferred embodiment, $V_1$ is one and one-quarter volts which represents a voltage at the capacitor 52 of fifteen volts. The voltage regulator 46 is still however capable of maintaining the PWRBUS voltage at five volts. The power voltage at the capacitor 52 continues to drop below fifteen volts for a short period of time before the twenty four volt a.c. power is restored. At time $t_3$, the RELPWR signal applied to the power detect circuit 22 again reaches $V_1$ prompting the power detect circuit to drop the "PF" signal low. It is to be appreciated that the PWRBUS voltage supplied to the microprocessor 20 and associated logic never dropped below five volts during the twenty four volt a.c. power outage which has just been described.

Referring now to time $t_4$, twenty four volt a.c. power is again interrupted, causing the relative power voltage, RELPWR, applied to the power detect circuit to again decline. This decline continues through the $V_1$ threshold at time $t_5$ prompting the "PF" signal to again rise. The voltage continues to decline as the twenty four volt a.c. power is not restored. At some time after $t_5$, the power bus voltage, PWRBUS, also begins to decline as the voltage at the capacitor 52 has now dropped to a voltage level of eleven volts which is not sufficient to allow the voltage regulator 46 to maintain five volts. At time $t_6$, the PWRBUS voltage reaches a critical voltage, $V_2$, of 4.65 volts prompting the power detect circuit 22 to generate a logically high RST signal. The elapsed amount of time, $\Delta t$ between times $t_5$ and $t_6$ must be such as to allow the microprocessor 20 to execute a power down sequence wherein all critical communications are made to the EEPROM 32 and the real time clock 38 as well as to the relay logic 26. It is to be appreciated that this time is governed by the amount of time the microprocessor 20 needs to perform these communications. It has been found that one hundred fifty milliseconds is sufficient for the preferred embodiment of FIG. 2. This time will of course depend on the microprocessor and the number of instructions it must execute to associated logic. It is this period of time that must be assured by the capacitance value of the capacitor 52. The capacitance for the particular configuration of FIG. 2 was defined to be three hundred thirty microfarads.

Referring now to time $t_7$, the twenty four volt a.c. power is again restored prompting the PWRBUS voltage out of regulator 46 to begin recovery. At time $t_8$, the PWRBUS signal passes through the $V_2$ threshold prompting the power detect circuit to bring the reset signal, RST, low. At this time, the microprocessor will begin a reset sequence which will cause the system of FIG. 2 to begin to power up after being totally down during the elapsed time between $t_6$ and $t_8$. The microprocessor 20 will however await the "PF" signal dropping logically low at time $t_9$ before initiating start up of the HVAC equipment. The "PF" signal drops logically low at time $t_9$ as a result of the RELPWR signals passing through the $V_1$ threshold.

Figure 4B:
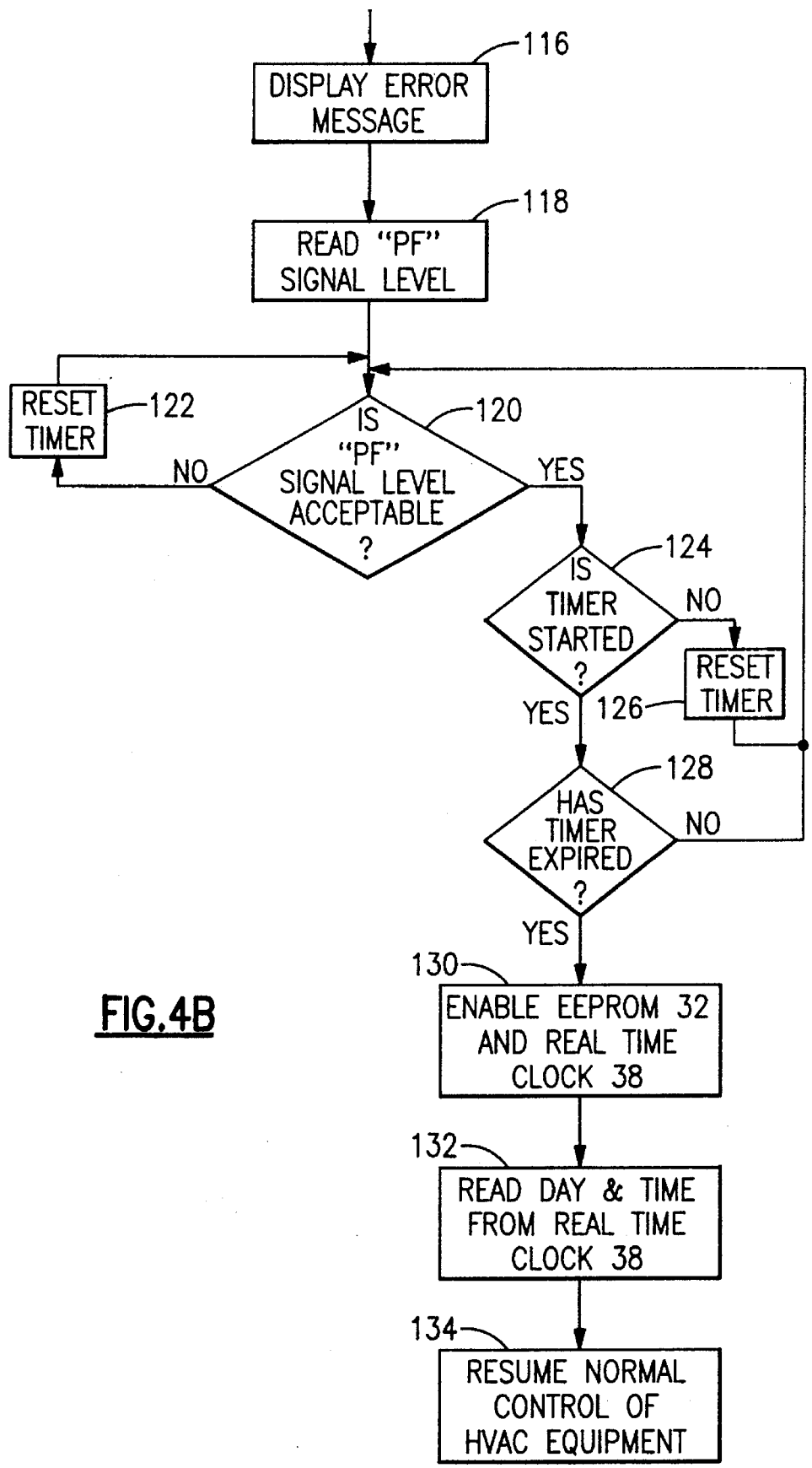

Referring to FIG. 4, the "power down" sequence executable by the microprocessor 20 is illustrated. This sequence begins with the receipt of a power fault interrupt signal, in a step 100. It will be remembered that the power fault signal is applied to an interrupt terminal of the microprocessor 20 so as to thereby precipitate an interrupt to any process executing within the microprocessor when the "PF" signal transitions from a logically low level to a logically high level. This occurs for instance at times $t_2$ and $t_5$ in FIG. 4. When the interrupt occurs, the microprocessor proceeds to a step 102 and turns off the HVAC equipment 26. This is accomplished by transmitting appropriate logic level signals to the relay logic 28. The microprocessor proceeds in a step 104 to inquire whether any communication is pending to the EEPROM 32. If the microprocessor was in the process of communicating with the EEPROM before interrupt, then the communication is completed in a step 106. It is to be noted that the control process normally executing within the microprocessor 20 will preferably write any critical operating information to the EEPROM 32 as soon as the information becomes available for use by the microprocessor. For instance, if a setpoint is changed by manipulation of the switches 14 and 16 on the control panel 24, then the resulting setpoint is immediately communicated to the EEPROM 32. The same would be true for mode of operation information and other critical information which the microprocessor normally uses during the control of the HVAC equipment.

The microprocessor proceeds directly from either step 104 or step 106 to disable any further communications to the EEPROM 32. In a manner similar to steps 104 through 108, the microprocessor checks the real time clock 38 for any pending communication in a step 110 and completes any pending communication in a step 112 before disabling any further communications to the real time clock in a step 114. An example of communications that need to be completed in a step 112 would be a user changing the time during the power down sequence. Any communication regarding such change in time would be completed to the real time clock in step 112.

The microprocessor proceeds in a step 116 to display an error message indicating that the system is responding to a noted problem. Following the display of an error message, the microprocessor proceeds to read the current signal level of the "PF" signal. It will be remembered that the "PF" signal may return to a logically low signal level. This occurs for instance at time $t_3$ in FIG. 4 when the twenty four volt a.c. power outage is only momentary. In the event that the "PF" signal remains logically high, the microprocessor resets a timer in step 122 and returns to the inquiry of step 120. Referring again to step 120, it is to be noted that inquiry will be repeatedly made as to whether the "PF" signal level reaches an "acceptable" logically low value as long as the microprocessor 20 remains operable under the emergency power condition. When the five volt emergency power to the microprocessor drops to a point where the microprocessor no longer can make this inquiry, then all further operation of the power down sequence ceases.

In the event that the "PF" signal level does recover to an acceptable logically high level before shutdown of the microprocessor then a step 124 is implemented. The microprocessor in step 124 inquires as to whether the timer has been started. The timer will have been the timer that is reset in step 122 and will define a period of time which must expire before normal operation of the microprocessor 20 can resume. The predefined period of time defined by the timer must be sufficient to allow for the main twenty four volt a.c. power to stabilize before normal operation is resumed. This time period was defined to be fifteen seconds in the particular embodiment. In the event that the timer has not been started, then the microprocessor resets the timer in step 126 before returning to step 120 and inquiring as to whether the "PF" signal level is still acceptable. If the "PF" signal level continues to remain acceptable and the timer has been started, the microprocessor will proceed from step 124 to step 128 and inquire as to whether the timer has expired. When this occurs the microprocessor will proceed to a step 130 and enable the EEPROM 32 and the real time clock 38. Step 130 marks the beginning of a return to normal control of the HVAC equipment.

Following the establishment of communication with the EEPROM 32 and the real time clock 38, in step 130 the microprocessor proceeds to read the day and time from the real time clock 38 in step 132. The microprocessor proceeds to initiate normal control of the HVAC equipment in step 134 pursuant to the time indicated by the real time clock 38.

As has been previously discussed, the microprocessor 20 may lose power during execution of the power down sequence. When this occurs, the microprocessor must be reset before normal operation can occur. A reset signal transition to a logically low signal level will be generated to the reset terminal of the microprocessor 20 when the power detection circuit 22 detects restoration of main power such as at time $t_8$ in FIG. 3. This triggers a "power up" sequence.

Figure 5:
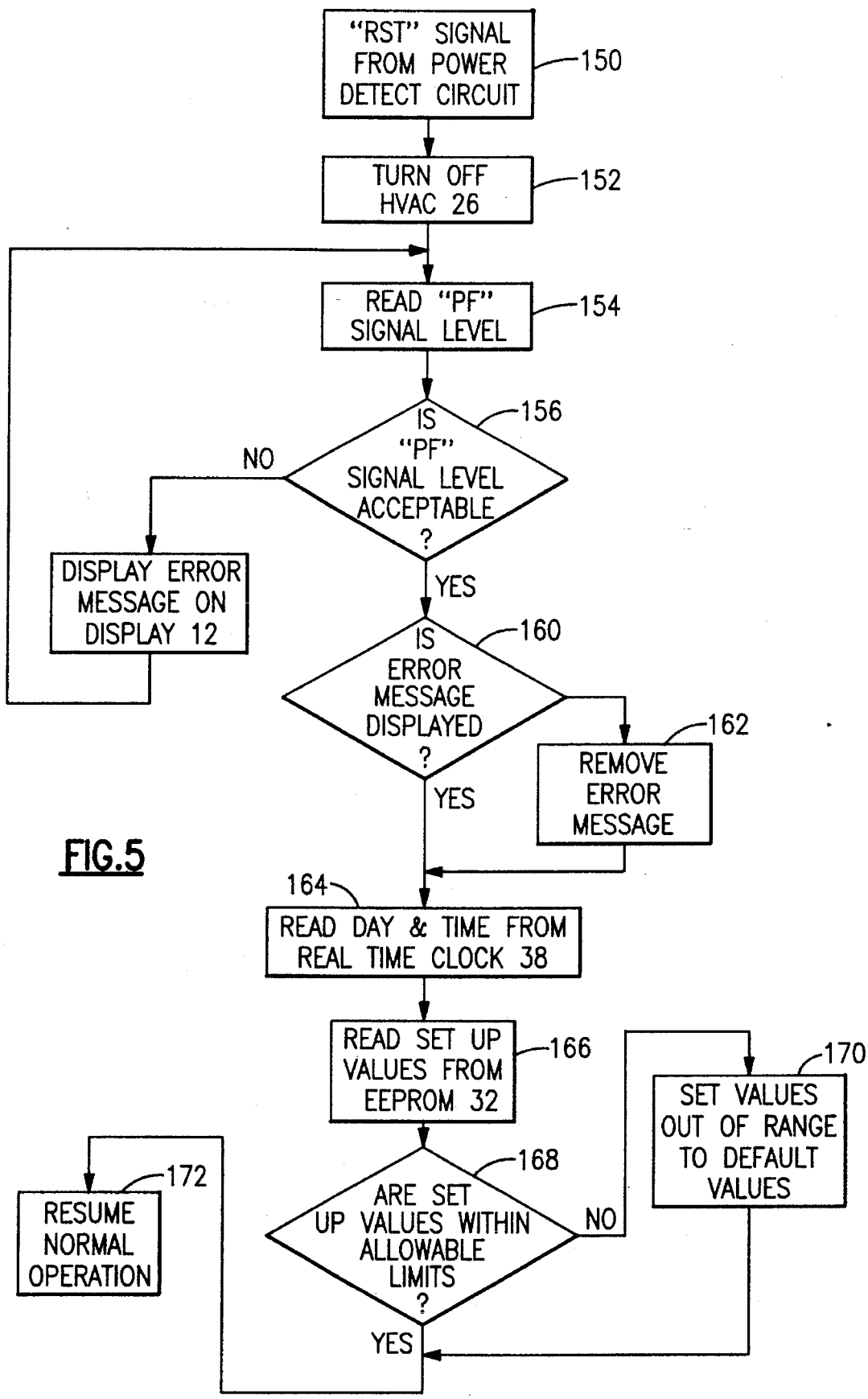
FIG. 5 is a power up process executed by the microprocessor of FIG. 2 when main power has been restored to the system.

Referring to FIG. 5, the reset signal at the reset input of the microprocessor prompts the "power up" sequence to be initiated in a step 150. The microprocessor proceeds in a step 152 to turn off the HVAC equipment 26 in the event that any signals have been erroneously generated to the relay logic 28 during the power outage. The microprocessor proceeds to a step 154, reads the "PF" signal level and inquires in a step 156 as to whether the "PF" signal level is acceptable. Referring to FIG. 3, the "PF" signal level will be logically high until time $t_9$. This is an unacceptable signal level which will prompt the microprocessor to continue to display an error message on the display in step 158.

When the "PF" signal level reaches an acceptable logically low level at time $t_9$, the microprocessor proceeds from step 156 to a step 160 and inquires as to whether an error message is being displayed. If the answer is yes, the error message is removed in a step 162 before proceeding to a step 164 wherein the day and time are read from the real time clock 38. The microprocessor proceeds in step 166 to read the setup values from the EEPROM 32. These setup values would include the mode of operation, fan condition, and setpoint temperature. These read values from the EEPROM are compared with acceptable limits for these values in a step 168. In the event that the values are erroneous from the EEPROM, the microprocessor proceeds to a step 170 and sets the various parameters necessary for startup equal to default values. Following execution of step 168 or step 170, the microprocessor proceeds to normal operation in a step 172.

It is to be appreciated that a system and process have been disclosed for extending the recovery capability of a microprocessor controlled thermostat during a power outage situation. This system is premised on maintaining long term emergency power only to the real time clock within the microprocessor control system. Power to all other elements is allowed to deteriorate after appropriate action has been taken in a power down sequence. The power down sequence moreover allows for recovery from an emergency situation as long as the integrity of the microprocessor control can be guaranteed.

It is to be appreciated that a particular embodiment of the invention has been described. Alterations, modifications and improvements thereto will readily occur to those skilled in the art. Accordingly the foregoing description is by way of example only and the invention is to be limited only by the following claims and equivalents thereto.

What is claimed is:

1. An electronically controlled thermostat comprising:

a processor for controlling the operation of heating, venting or air conditioning equipment in response to control information having been provided to the thermostat;

a nonvolatile memory operatively connected to said processor, said nonvolatile memory having the control information stored therein for recall when said processor loses its main source of power;

a real time clock operatively connected to said processor so as to provide accurate real time information to the processor; and an emergency power source connected only to said real time clock so as to maintain the integrity of the real time clock during loss of power to said processor, said nonvolatile memory and said heating, venting or air conditioning equipment.

2. The electronically controlled thermostat of claim 1 further comprising:

a common power bus connected to said processor, nonvolatile memory, and real time clock, a limited emergency power source attached to said common power bus for supplying power to said processor and said nonvolatile memory for a short period of time relative to the time that emergency power can be supplied by said emergency power source connected only to said real time clock.

3. The electronically controlled thermostat of claim 2 further comprising:

a power detection circuit connected to said limited emergency power source and to an interrupt terminal of said processor, said power detection circuit being operative to generate a power fault signal to said interrupt terminal of said processor when a predetermined voltage is produced by the limited emergency power source.

4. The electronically controlled thermostat of claim 3 wherein said processor is operative to monitor the signal level of the power fault signal and return to a normal control of said heating, venting or air conditioning equipment following return of the power fault signal to an acceptable signal level.

5. The electronically controlled thermostat of claim 3 wherein said power detection circuit includes:

an input for receiving the power supply voltage being supplied from said power bus to said processor, and an output for transmitting a reset signal to said processor when the power supply voltage to said processor reaches an acceptable voltage level.

6. The electronically controlled thermostat of claim 5 wherein said processor is operative to monitor the signal level of the power fault signal and restore normal control of the heating, venting or air conditioning equipment only when the power fault signal changes signal levels following receipt of the reset signal from said power detect circuit.

7. The electronically controlled thermostat of claim 1 further comprising:

a power detection circuit having an input for receiving a power supply voltage being supplied to said processor and an output for transmitting a reset signal to said processor when the power supply voltage being supplied to said processor reaches an acceptable voltage level whereby said processor is operative to read the control information stored in the non volatile memory and the real time information provided by said real time clock before initiating normal operation.

8. A process for maintaining the integrity of operating information necessary for a thermostat to control a heating, venting or air conditioning system, said process comprising the steps of:

providing a main source of power to all elements of the thermostat which are to process or maintain the operating information;

providing a separate source of power to a real time clock within the thermostat;

detecting when a voltage from the main source of power drops below a predetermined voltage level; and checking whether the operating information necessary to control the heating, venting or air conditioning system has been stored in a nonvolatile memory when a drop is detected below the predetermined voltage level.

9. The process of claim 8 further comprising the step of:

monitoring the voltage from the main source of power following a drop below the predetermined voltage level; and restoring ordinary control of the heating, venting or air conditioning equipment when the voltage from the main source of power again exceeds the predetermined voltage level.

10. The process of claim 9 wherein an element of the thermostat receiving power from said main source of power is a processor that ordinarily controls the heating, venting or air conditioning system, and wherein said step of restoring ordinary control comprises the steps of:

enabling communication between the processor and the real time clock whereby the current time is immediately available to the processor so as to allow ordinary control of the heating, venting or air conditioning system to commence.

11. The process of claim 10 wherein said step of restoring ordinary control further comprises the steps of:

defining a period of time which must elapse before entering said step of enabling communication between the processor and the nonvolatile memory.

12. The process of claim 9 wherein an element of the thermostat receiving power from said main source of power is a processor that ordinarily controls the heating, venting or air conditioning system and wherein said process further comprises the steps of:

monitoring the voltage level of the power voltage received by the processor;

detecting when the voltage level of the power voltage received by the processor drops below a predetermined power voltage level for the processor; and generating a signal to the processor which prevents the processor from exercising ordinary control of the heating, venting or air conditioning system when the voltage level of the power voltage received by processor drops below the predetermined power voltage level for the processor.

13. The process of claim 12 further comprising the steps of:

detecting when the voltage level of the power voltage received by the processor rises above the predetermined power voltage level for the processor; and changing the signal level of the signal to the processor which prevents the processor from exercising ordinary control of the heating, venting or air conditioning system whereby the processor may thereafter exercise ordinary control of the heating, venting or air conditioning system.

* * * * *